Jan. 5, 1926. 1,568,117
J. F. WHITMAN
APPARATUS FOR THE STANDARDIZATION OF SOLUTIONS
Filed August 27, 1924  2 Sheets-Sheet 2
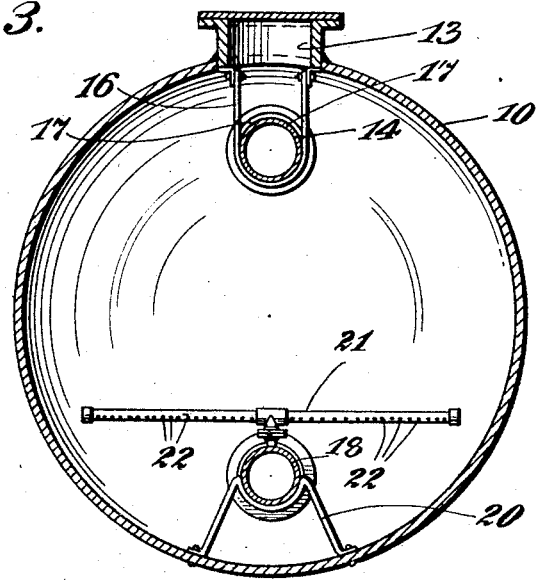
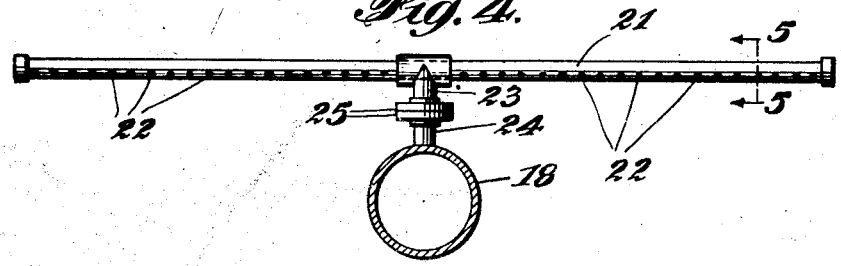
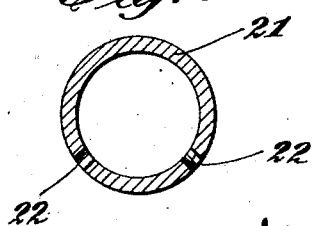

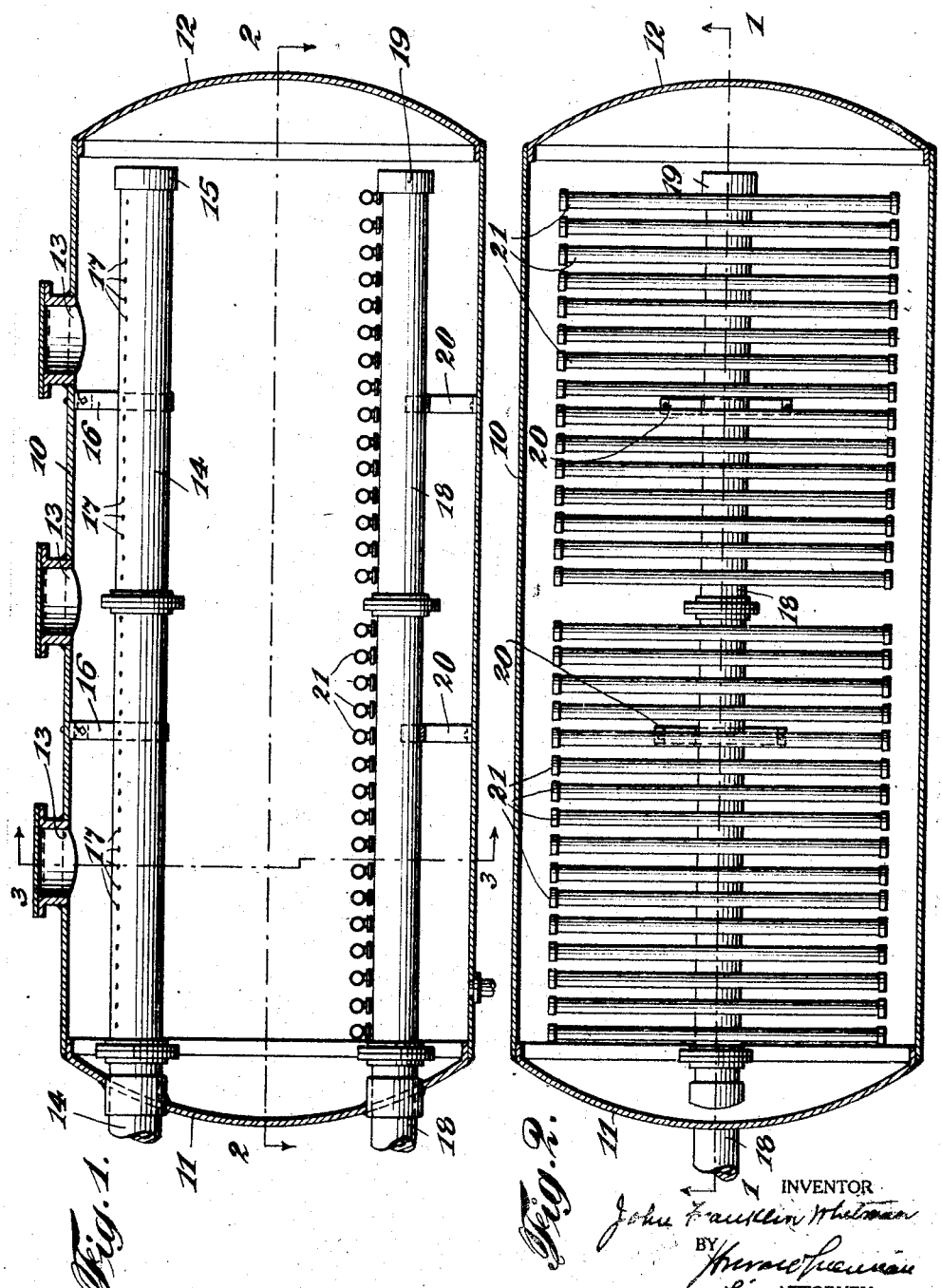

Patented Jan. 5, 1926.

1,568,117

UNITED STATES PATENT OFFICE.

JOHN FRANKLIN WHITMAN, OF BROOKLYN, NEW YORK.

APPARATUS FOR THE STANDARDIZATION OF SOLUTIONS.

Application filed August 27, 1924. Serial No. 734,547.

*To all whom it may concern:*

Be it known that I, JOHN FRANKLIN WHITMAN, a citizen of the United States, residing at Brooklyn, county of Kings, city of New York, and State of New York, have invented new and useful Improvements in Apparatus for the Standardization of Solutions, of which the following is a full, clear, and exact specification.

My invention relates to apparatus suitable for an effective inter-mixture of liquids and refers particularly to apparatus of this character suitable for the standardization of liquids containing chemicals in solution.

It is frequently desirable to maintain a liquid mass at a standard strength of chemical contents and to replace the liquid removed therefrom and to replace the water evaporated therefrom, by a liquid of such quantity and contents as to maintain uniformity in the original liquid mass.

It is further frequently desirous that the additive dissolved chemicals be introduced into the original liquid mass in such a manner as not to cause an unequal concentration of the chemicals in a particular portion of the mass, and this is particularly desirable when the liquid mass is of such size and character as not to allow of agitation or stirring.

I will describe the application of my invention to swimming tanks, although I do not limit its use to that particular purpose.

In inland salt water swimming tanks, where it is necessary to employ fresh water, it is desirable to have the chemical content of the water as nearly approximate that of ocean, or sea, water as possible, and, in order to accomplish this, certain chemicals must be added to the fresh water in proper portions, so that the water in the tank will have an approximate chemical constitution, or strength, to that of sea water.

If the liquid mass in the tank remained constant, this could be readily attained by adding the proper quantities of the chemicals, when the tank is originally filled, and no further operations would be necessary.

In the practical use of swimming tanks, however, this condition does not occur.

There is a constant and a very considerable depletion of the amount of liquid in a swimming tank, due, in part, to the overflow caused by the agitation of the liquid produced by the swimmers, the liquid physically removed by the bodies and suits of the swimmers and in somewhat smaller degree by evaporation of the water.

It is therefore necessary that this amount of removed liquid be replaced by new liquid and that this additive liquid have the proper chemical composition.

It is further evident that the addition of the chemicals, or a strong solution of the chemicals, to one portion of the tank will result in an unequal, and undesirable concentration of chemicals within the tank, and as these tanks are of such a character as not to be capable of mechanical agitation, this inequality of chemical composition will remain practically constant unless overcome by the agitation of the liquid mass by the swimmers.

The device of my invention is adapted for overcoming the above and other difficulties and present means whereby the desirable standardization of the swimming bath may be retained.

My device, suitable for the described process, comprises a receptacle capable of holding a liquid and so connected with the swimming tank that the tank liquid can be forced into the receptacle and then back into the tank, after having been properly charged with the chemicals.

In order to accomplish the object of my invention, the amount of water to be added to the swimming tank is calculated and from this the amount of each chemical necessary to standardize the additive amount of water is determined, the strength of a standard tank solution being known.

The necessary amount of ordinary water is added to the swimming tank and the necessary amounts of chemicals, preferably in solution, are introduced into my device which is then filled with water. My device now contains the amount of chemicals necessary to bring the entire swimming bath to standard.

I now pass the tank liquid through my device and back into the tank in a circulating system in such a manner that the chemicals are gradually added to the tank, the continuous passage of the liquid causing a uniform addition of the chemicals, preventing the formation of highly concentrated portions of the swimming bath.

My device has the further advantage of being capable of introduction within any ordinary sterilizing, or circularizing, system without change or alteration of any of the parts thereof.

My invention, therefore, presents many novel and valuable features, particularly applicable to swimming baths where a standard chemical content is desirable.

In the accompanying drawings, illustrating one form of the device of my invention, suitable for my process, similar parts are designated by similar numerals.

Figure 1 is a vertical longitudinal section of one form of the device of my invention taken through the line 1—1 of Figure 2.

Figure 2 is a horizontal longitudinal section of one form of the device of my invention taken through the line 2—2 of Figure 1.

Figure 3 is a cross-section taken through the line 3—3 of Figure 1.

Figure 4 is an enlarged view of one of the feed pipes and its connections with the exit pipe as shown in Figure 3.

Figure 5 is a cross-section through the line 5—5 of Figure 4.

The particular form of the device of my invention, shown in the accompanying drawings, comprises a cylindrical tank, or receptacle, having the side 10 and the ends 11 and 12. The side 10 has the closable openings 13, 13, 13, an entrance pipe, or conduit, 14 enters the receptacle through its end 11, the inner end of the pipe being closed by the cap 15. The pipe 14 is supported by the straps 16, 16, 16 and has a plurality of openings 17, 17, 17 in its upper longitudinal portion. The pipe 14 is connected with the water in the swimming tank and has an intermediate pump, if necessary, for forcing the water from the swimming tank into the pipe 14 and through its openings 17, 17, 17. The swimming tank and the means of connecting it with the pipe 14 are not shown, as they are not a part of my invention.

In the lower portion of the receptacle is a longitudinally positioned exit pipe, or conduit, 18 entering through the receptacle end 11 and having its interior end closed by means of the cap 19. The pipe 18 is supported by the brackets 20, 20.

A plurality of feed pipes 21, 21, having perforations, or openings, 22, 22 in their lower portion and their ends closed, are angularly positioned with respect to the exit pipe 18 and open into, and are connected to, the pipe 18 by means of the pipes 23 and 24, which latter pipes are connected by the flange joints 25, 25.

The pipe 18 is connected to the swimming tank and may have filters, pumps, heaters, sterilizers, or other devices intermediate thereof, if desired. The swimming tank and the means of connecting it with the pipe 18 are not shown, as they are not a part of my invention.

The operation of my device is as follows:—

The amount of water which must be added to the swimming tank in order to bring it to its desired content is determined and the amounts of chemicals necessary to bring this determined amount of water to a standard of consistency are calculated. The determined amount of fresh, or ordinary, water is added to the swimming tank and a solution of the calculated amounts of chemicals are introduced into the receptacle through the openings 13, 13 and water added until the receptacle is full, when the openings 13, 13 are closed.

The water from the swimming tank is then forced through the entrance pipe 14, thence through the pipe openings 17, 17, 17 and which is thus diffused through the upper portion of the liquid in the receptacle. This pressure upon the liquid contents of the receptacle forces the liquid through the plurality of openings 22, 22 of the feed pipes 21, thence through the pipes 23 and 24 into the pipe 18 and thence back into the swimming tank.

It will be noted that the water from the swimming tank is thus forced through the liquid contents of the upper part of the receptacle throughout practically its entire length, thus causing a uniform distribution of the tank water in the receptacle and that the liquid contents of the receptacle are fed to the exit pipe 18 uniformly from all parts of the lower portion of the receptacle.

By means of my device, therefore, there is a gradual and uniform intermixture of the swimming tank water, which is to be charged with chemicals, with the solution of the chemicals in the receptacle, and hence, the swimming tank water is brought uniformly to the standard degree of chemical consistency.

It is to be further noted that this diffusion of the tank water with the receptacle liquid is enhanced in a cylindrical receptacle, as illustrated, as the incoming water is deflected by the circular face of the side 10, thus readily forming a current of liquid downwardly around the inner face of the receptacle side and upwardly through the inner portion of the receptacle, thus causing a uniform mixture circulation.

I do not limit myself to the particular size, shape, number, or arrangement of parts, as shown and described, as these are given simply as a means for clearly explaining the device of my invention.

What I claim is:—

1. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, exit means connected with the receptacle and means capable of forcing a liquid through the perforated pipe inwardly of the receptacle and outwardly through the exit means.

2. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, a second perforated longitudinal pipe within the receptacle and extending outwardly of the receptacle and means capable of forcing a liquid through the upper perforated pipe inwardly of the receptacle and outwardly of the receptacle through the second perforated pipe.

3. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, the perforations being upwardly directed, a second perforated longitudinal pipe within the receptacle and extending outwardly of the receptacle and means capable of forcing a liquid through the upper perforated pipe inwardly of the receptacle and outwardly of the receptacle through the second perforated pipe.

4. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, a second perforated longitudinal pipe within the receptacle and extending outwardly of the receptacle, a plurality of feed pipes connected with the second pipe and in angular position thereto and means capable of forcing a liquid through the upper perforated pipe inwardly of the receptacle and outwardly of the receptacle through the second perforated pipe.

5. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, the perforations being upwardly directed, a second perforated longitudinal pipe within the receptacle and extending outwardly of the receptacle, a plurality of feed pipes connected with the second pipe, and in angular position thereto, and means capable of forcing a liquid through the upper perforated pipe inwardly of the receptacle and outwardly of the receptacle through the second perforated pipe.

6. In a device suitable for a circulating system for standardizing the chemical content of a solution, in combination, a receptacle, closable means for introducing a liquid directly into the receptacle, a perforated pipe positioned longitudinally within the upper portion of the receptacle and extending outwardly of the receptacle, the perforations being upwardly directed, a second perforated longitudinal pipe within the receptacle and extending outwardly of the receptacle, a plurality of perforated feed pipes connected with the second pipe and in angular position thereto and means capable of forcing a liquid through the upper perforated pipe inwardly of the receptacle and outwardly of the receptacle through the second perforated pipe.

Signed at New York city, in the county of New York and State of New York, this 20th day of August, 1924.

JOHN FRANKLIN WHITMAN.